United States Patent [19]

Jost

[11] Patent Number: 4,642,156

[45] Date of Patent: Feb. 10, 1987

[54] APPARATUS FOR FORMING A REINFORCING BAND ON A SECTIONAL SEALING LINER

[75] Inventor: Ralph Jost, Füllinsdorf, Switzerland

[73] Assignee: Hobas Engineering & Durotec AG, Switzerland

[21] Appl. No.: 709,502

[22] Filed: Mar. 8, 1985

[30] Foreign Application Priority Data

Mar. 9, 1984 [CH] Switzerland ............... 1176/84

[51] Int. Cl.$^4$ ............................................. B65H 81/00
[52] U.S. Cl. ..................................... 156/425; 249/68; 425/441
[58] Field of Search ............... 156/425, 175, 173, 172, 156/415; 249/184, 178, 66 R, 67, 68; 425/441; 242/72 R, 22.1, 73; 285/423, 369

[56] References Cited

U.S. PATENT DOCUMENTS 4,174,125 11/1979 Wyss ................................. 285/423
4,213,641 7/1980 Bennett ............................. 156/425

4,364,894 12/1982 Mayumi et al. ..................... 156/425

*Primary Examiner*—Michael Ball
*Attorney, Agent, or Firm*—McGlew and Tuttle

[57] ABSTRACT

Glass roving is directed through a soaking tub which is supplied with resin and a setting agent, and trained as a flat-pressed band to a forming unit. The forming unit comprises a two-part mold which is formed by the flange portions of two mold discs and becomes automatically coupled in its closing position. The mold discs are supported on separate coaxial shafts, each of which is associated with a drive for opening and closing the mold. One of the mold parts comprises a cylindrical portion by which, upon opening the mold, the finished sleeve is supported. Pusher pistons provided at this mold part becomes effective automatically as the mold is opened to push off the molded sleeve. All working, drive and conveying means, as well as all switching and control elements are under the control of a common programmable central unit.

9 Claims, 4 Drawing Figures

APPARATUS FOR FORMING A REINFORCING BAND ON A SECTIONAL SEALING LINER

FIELD AND BACKGROUND OF THE INVENTION

This invention relates in general to the manufacture of sealing tubes and in particular to a new and useful method and apparatus for fabricating a sealing sleeve for tubes using a forming unit in which a plastic soak reinforcing band is wound upon a sealing liner.

In prior art assemblies intended for the fabrication of coupling means for tubes having diameters from 40 to 200 cm, for example, it is difficult to make the process automatic, since the adjustment and handling of the forming unit, mostly comprising a two-part mold, is complicated and time consuming. This leads to longer interruptions particularly during the operations of opening, removal and closing, unfavorably affecting the fabricating economy.

SUMMARY OF THE INVENTION

The present invention is directed to an assembly or apparatus for manufacturing tubes permitting an automatic, i.e. programmable, operation which can be conducted without longer interruptions.

In accordance with the method of the invention, a roving of a material such as fiberglass is pulled off a reel of reinforcing material to pass through a soaking tub and formed into one or more bands of rovings which are directed over a guide and secured to a clamp of a forming unit. The forming unit comprises a mold made up of two mold parts which are contained on axially shiftable shafts which may be displaced in order to open and close the mold and which may be rotated to rotate the mold to effect the winding. One of the mold parts has a cylindrical wall which is axially longer than the other and it forms a base for the sealing liner which is applied over the exterior surface of the mold part over an insert. The two mold parts are then closed and in so doing they are automatically coupled and they are rotated by a rotary drive means to effect the winding of the rovings over the sealing liner. The longer of the two mold parts is also provided with a pusher element which easily effects the pushing off of the sealing liner with the rovings after the molding process is through. The forming unit is controlled by a controller which regulates both the axial and rotary drive.

Advantageously, the forming unit is associated with a setting unit which is equipped with blue light lamps and infrared radiators, for example, and is also controllable through the common controller. The same is true for the band procedure, feeding, and soaking parts of the assembly where all drives are controllable through this controller. The invention makes it possible to actuate the mold parts and the elements associated therewith in accurately timed sequences and automatically, so that the entire fabrication of sealing sleeves can take place without longer interruptions and in a reproducible manner.

Accordingly, it is an object of the invention to provide an improved method of forming sealing sleeves for tubes using a forming machine in which the sealing tube is placed over a wall of a mold part and rotated in order to effect the winding of reinforcing material over the sealing liner.

A further object of the invention is to provide an improved forming unit for effecting the formation of a sealing sleeve for tubes.

A further object of the invention is to provide a forming device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
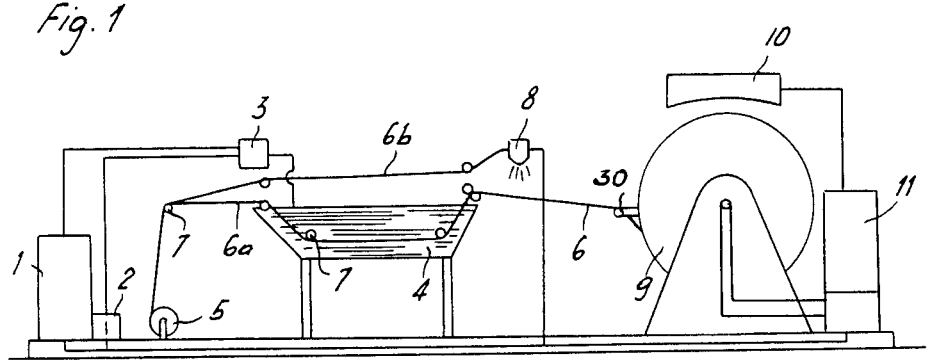
FIG. 1 is a diagrammatical illustration of the inventive assembly.

Referring to the drawings in particular the invention embodied therein comprises a method and apparatus for fabricating a sealing sleeve for tubes which comprises a forming unit 9 for winding a plastic-soaked reinforcing band 6 onto a sectional sealing liner D which is placed on an insert C arranged on a cylindrical portion 25 of a mold part of the forming machine 9. For this purpose, reinforcing material from a reel supply 5 is fed off and passed into a soaking tub of resinous material before it is wound on the mold during the rotation of forming unit 9.

The assembly illustrated in FIG. 1 comprises a resin tank 1 and a tank 2 for a setting agent, each equipped with a feed pump. Feed lines lead from these tanks to a mixer 3 whose outlet opens to a soaking tub 4. Further provided is a supply 5 of reinforcing material, advantageously glass fiber rovings. A bundle of rovings 6a is trained from supply 5 to guide rollers 7 in soaking tub 4. Following guide rollers 7, squeeze rollers for removing resin in excess may be provided. In addition, indiviudal roving fibers are branched off and directed to a cutting device 8 having its outlet in a position above the location where the resin-soaked bundle rovings leaves soaking tube 4. Upon soaking the bundle or rovings with resin, and coating it with cut glass-fiber particles, a reinforcing band 6 is formed which passes to a forming unit 9 where it is wound onto a sealing liner supported by one part of the mold of the forming unit. To make the resin in the wound band cure or set, a setting unit 10 is associated with forming unit 9. Further provided is a controller 11 which is common to all the drives and working elements of the assembly.

Figure 2:
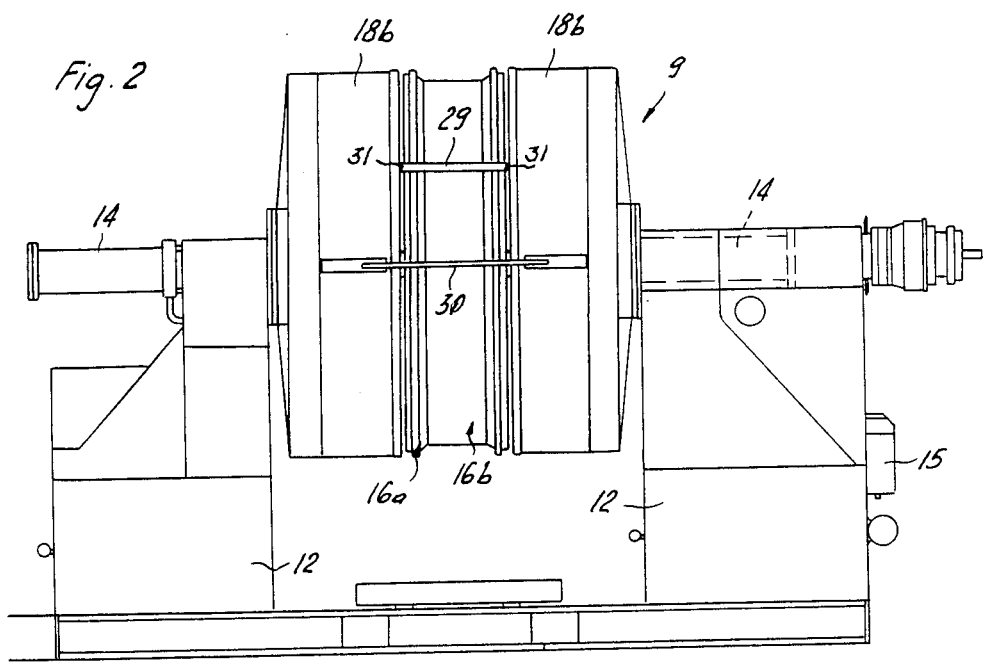
FIG. 2 is a side view of the forming unit shown in FIG. 1.
Figure 3:
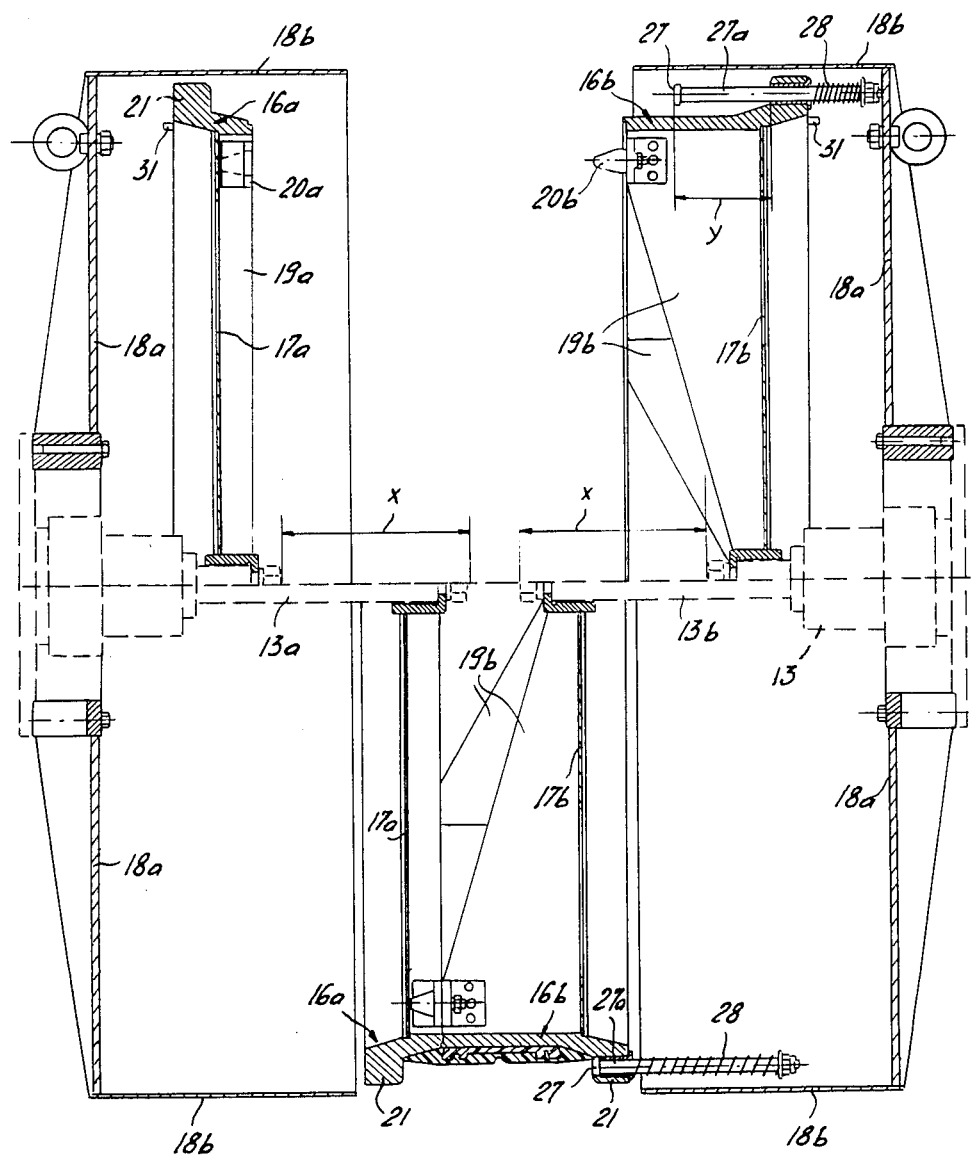
FIG. 3 is an enlarged sectional view taken through the axis of the forming unit of FIG. 2.
Figure 4:
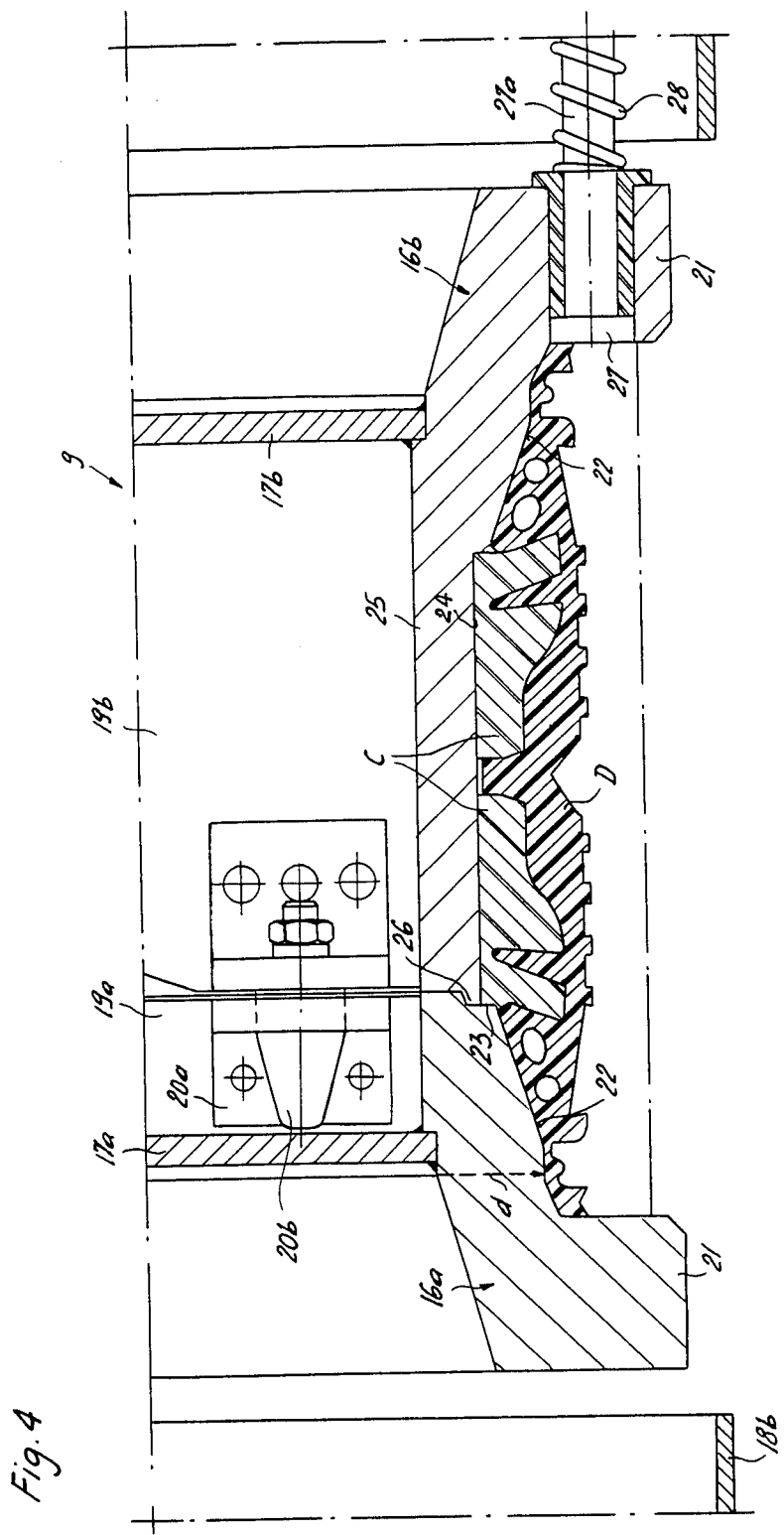
FIG. 4 is a detail of FIG. 3 on a larger scale.

Forming unit 9, shown in more detail in FIGS. 2 to 4, comprises two coaxially aligned supporting shafts 13a, 13b which are guided on bearing brackets 12 for displacement and rotary motion. The mutually remote ends of the shafts are connected each to a hydraulic power piston 14, and shaft 13b is in addition connected to a hydraulic motor 13. Each of the facing end portions of the shafts 13a and 13b carries a mold disc 17a, 17b, respectively, provided each with a flange portion 16a, 16b. The two flange portions 16a, 16b form a two-part mold for winding the sealing sleeve. The two bearing brackets 12, by which discs 17a, 17b are supported through shafts, also support at each side a protective wall 18a carrying a cylindrical cover 18b by which mold parts 16a, 16b are surrounded in the open position of forming unit 9. The inner bearing rims of cylindrical covers 18b are spaced from each other by a distance which somewhat exceeds the axial length of the mold in a closed position. The two discs 17a and 17b of the mold are reinforced with radial webs 19a, 19b which are circumferentially distributed. At the outside ends of these radial webs, coupling blocks 20a with axially extending conical engaging sockets are provided on flange portion 16a, and taper pins 20b matching with the conical sockets of blocks 28 are provided in alignment therewith on flange portion 16b.

Each of the two mold parts 16a and 16b is formed on its outside remote from the other mold part with a peripheral ring 21 which is followed in the direction toward the central plane of the mold by an inwardly tapering surface 22, which, in the present example, is slightly curved. In the flange portion 16a, this tapering surface 22 terminates at a recess 23 of the front face of this flange portion. In the other flange portion 16b, the tapering surface 22 terminates at a recess 24 bounding a cylindrical portion 25. Flange portion 16b, which is longer than flange portion 16a by the axial length of cylindrical portion 25, terminates frontally by a circular shoulder 26 fitting in the recess 23 of flange portion 16a. The outer diameter of the cylindrical portion 25 is slightly smaller than the outer diameter, corresponding about to the diameter d indicated in FIG. 4, of the tubes which are to be coupled to each other with the sealing sleeve to be fabricated.

In the peripheral ring 21 of flange portion 16b, a plurality (depending on the size of the sleeve to be fabricated) of pusher pistons 27 is seated by their shank which is biased by a helical spring 28 tending to retract the piston into the seat, away from the mold.

The forming unit for fabricating a sealing sleeve operates as follows:

Starting from a closed position of the mold, which is shown in FIG. 2, in FIG. 3 below, and in FIG. 4, i.e. after a single-piece sealing liner D sectionally shaped both inwardly and outwardly and backed up by an insert C has been engaged on the cylindrical portion 25 of the open mold, and then the mold is closed. The free end portion of a reinforcing band. which has been treated in the soaking tub and fed into the forming unit, is grasped by means of the clamping member 29 (FIG. 2), and applied against a guide element 30 and against cylindrical covers 18b. Clamping member 29 is then attached to lateral projections 31 provided on the two mold parts. The mold is then set in rotation, to pull the band 6 in. Due to the angling about guide rod 30, the reinforcing band is flattened and passes in this flattened shape to the mold where the initial pulling is effected by the sectional circumference, or grooves, of the sealing liner. After an almost complete revolution of the mold, the band is separated by cutting from clamping member 29. The winding operation then continues by rotating the mold and thereby pulling in band 6 which has been soaked with resin and covered with roving particles cut in device 8, until a wound body having a sufficient thickness is obtained between peripheral rings 21. The band fed in is then cut off. The free end of the band is instantly again provided with the clamping member 29 and thus made ready for the next winding operation. Thereupon, the setting unit 10 is put in operation. It should be noted that with the use of resin in combination with a setting agent which is responsive to heat, a setting by means of infrared radiators would be satisfactory. However, gelling of resins under infrared radiation takes relatively much time, so that after finishing the winding and during the curing operation, relative large amounts of resin still drop down from the rotating wound body, which, of course, is undesirable. A particular advantageous remedy has been found in the addition to the resin of a stabilizer responsive to light. If such a stabilizer is employed, setting unit 10 is equipped with blue light lamps. The lamps cause a relatively fast gelling of the resin of the outer turns of the wound body, while the infrared radiation effects a setting up to the innermost layers. After terminating the setting, i.e. as soon as the reached degree of setting makes possible further handling of the finished sleeve, the mold is stopped and opened. As shown in FIG. 3, the two mold parts 16a, 16b and thereby retracted by strokes x into the respective covers 18b. During the retraction of mold part 16b carrying on it cylindrical portion 25 the finished sleeve, shanks 27a of pusher pistons 27 come to butt against wall 18a so that springs 28 are compressed and pistons 27 come to protrude from peripheral ring 21 by a stroke distance y (FIG. 3 above). The sleeve is thereby pushed out to the zone between covers 18b where is can easily be pulled off cylindrical portion 25 and radially removed from the mold. In the same way, a new sealing liner D with a backup insert C is now engaged on the cylindrical portion 25. The mold is then closed until pins 20b completely engage conical sockets of blocks 20a. This coupling produces not only a very satisfactory locking in rotation between the two mold parts, but also their automatic centering. The band end can now again be attached by the clamping member 29 to projection 31 of the mold parts, and the operation is repeated.

It may easily be understood from the foregoing that except for the securing and attaching of the clamping member, cutting of the band, and removal of the finished sleeve, all the operations requiring a working or moving drive and all switching and controlling elements can be program-controlled through a common controller 11. Entered into controller 11 may be programs for fabricating sleeves of unequal diameters, with the use of different resins and setting agents, and for coating the bands with roving fragments of various lengths and/or different orientation, This makes it possible to fabricate sealing or coupling sleeves in a minimum time, with minimum labor costs an in a predetermined reproducible quality.

While specific embodiments of the invention have been shown and described in detail to illustrate the application of the principles of the invention, it will be understood that the invention may be embodied otherwise without departing from such principles.

What is claimed is:

1. An apparatus for forming a sealing sleeve for tubes, comprising first and second opposed mold parts, first and second coaxial shafts secured to said respective mold parts, first and second brackets for carrying said respective shafts, first and second linear drive means connected to said respective shafts and mounted on said respective brackets for moving said shafts axially toward each other to close said mold parts and axially away from each other to open said mold parts, one of said mold parts having a side circumferential wall which is axially longer than the other of said mold parts, coupling means having at least one coupling part connected to each of said mold parts for automatically rotationally engaging said first and second mold parts upon closing said mold parts to bring said coupling parts of said coupling means together, said coupling parts of said coupling means being automatically disconnected from each other with opening of said mold parts, rotary drive means mounted on only one of said brackets and connected only to one of said shafts mounted on said one bracket to rotate said first and second molding parts when said molding parts are closed, a plurality of pushers movably mounted with respect to and associated with said axial longer mold part, pusher drive means associated with said bracket which carries said shaft of said longer mold part for automatically moving said pushers when said mold parts are opened, and a programmable common controller connected to said rotary drive means and said linear drive means for opening and closing said mold parts and for rotating said mold parts according to a program.

2. An apparatus according to claim 1, wherein the longer one of said mold parts provides a support for a sealing liner, each of said mold parts having flanges projecting radially outwardly from one end thereof, means for directing a resin soaked reinforcing material over said sealing liner between said flange portion when said mold parts are rotated.

3. An apparatus according to claim 1, wherein said pushers comprise a plurality of spring loaded pusher pistons carried by one of said mold parts having a front end abutting against an edge of the sealing liner in a position to strip the sealing liner with the winding thereon from the mold part when the mold part is retracted.

4. An apparatus according to claim 1, including heating means above said mold parts for heating materials carried by said mold parts.

5. An apparatus according to claim 1, wherein each of said mold parts comprises a disk connected to one of said shafts and axially movable thereby, a stationary cylindrical cover connected to each bracket and at least partly covering each mold part respectively, said cylindrical covers being spaced apart by an axial length of said mold part when said mold parts are closed.

6. An apparatus according to claim 5, wherein each of said pushers comprises a pusher piston movably mounted in the axial direction to said long mold part, each pusher piston being slidable over said side circumferential wall of said longer mold part for removing a sealing sleeve formed on said circumferential wall, a spring engaged with said pusher piston for biasing said pusher piston away from said circumferential wall of said longer mold part, said pusher drive means comprising said pusher pistons being postioned to engage said cylindrical cover of said bracket carrying said longer mold part when when said mold parts are open to push said pusher pistons against the bias of their spring over said circumferential wall of said longer mold part.

7. An apparatus according to claim 6, including a guide rod extending parallel to said shaft and fixed on an outside of said cylindrical covers for guiding and flattening a resin-soaked reinforcing band formed by parallel rovings and to be used to form a sealing sleeve on said mold part.

8. An apparatus according to claim 7, wherein both of said mold parts include a projection, and a clamping member for clamping an end of the resin-soaked resinforcing band, said clamping member being engaged with said projections for holding the clamping member to said molding parts.

9. An apparatus according to claim 8, including a setting unit mounted over said mold parts and cylindrical covers for heating and setting a sealing sleeve formed on said mold parts.

* * * * *